United States Patent [19]

Furuhashi et al.

[11] Patent Number: 4,942,148

[45] Date of Patent: Jul. 17, 1990

[54] CATALYST COMPONENT FOR OLEFIN POLYMERIZATION

[75] Inventors: Hiroyuki Furuhashi; Akira Nakano; Masahide Murata; Masafumi Imai; Hiroshi Ueno, all of Saitama, Japan

[73] Assignee: Toa Nenryo Kogyo, K.K., Tokyo, Japan

[21] Appl. No.: 256,514

[22] Filed: Oct. 12, 1988

[30] Foreign Application Priority Data

Oct. 12, 1987 [JP] Japan .................................. 62-25477

[51] Int. Cl.$^5$ ............................................... C08F 4/64
[52] U.S. Cl. ..................................... 502/115; 502/108
[58] Field of Search ........................ 502/108, 115, 133

[56] References Cited

U.S. PATENT DOCUMENTS 4,295,991 10/1981 Wristers ........................ 502/108 X Primary Examiner—Patrick P. Garvin
Attorney, Agent, or Firm—M. B. Kurtzman

[57] ABSTRACT

A catalyst component for olefin polymerization, prepared by bringing a titanium-containing solid which comprises (a) a metal oxide, (b) an organomagnesium compound represented by the following general formula:

$$R^1MgR^2$$

wherein $R^1$ and $R^2$ each represents a hydrocarbon group containing from 1 to 20 carbon atoms, a halogen atom, or an $OR^3$ group in which $R^3$ represents a hydrocarbon group containing from 1 to 12 carbon atoms, provided that $R^1$ and $R^2$ do not represent a halogen atom at the same time, (c) an electron donor compound, and (d) a titanium compound having contacted with each other, into contact with (e) an α-olefin containing 3 carbon atoms or more in the presence of (f) an organoaluminum compound, to thereby contain a poly(α-olefin) in an amount of from 0.1 to 100 g per gram of said titanium-containing solid.

2 Claims, No Drawings

CATALYST COMPONENT FOR OLEFIN POLYMERIZATION

BACKGROUND OF THE INVENTION

The present invention relates to a catalyst component for olefin polymerization.

Some catalyst components for olefin polymerization using, as a raw material, a metal oxide such as silica, which are capable of producing polyolefins (e.g., polypropylene) having high stero-regularity and excellent particle characteristics (spherical particles having a narrow particle size distribution) in a high yield, have been proposed.

For example, there are known a catalyst component comprising a reaction product between a metal oxide and a magnesium dialkoxide, an electron donor compound, and a tetravalent titanium halide having contacted with each other (see Japanese Patent Application Kokai No. 162607/1983); and a catalyst component comprising a reaction product between an inorganic oxide and a magnesium hydrocarbyl halide compound, a Lewis base compound, and titanium tetrachloride having contacted with each other (see Japanese Patent Application Kokai No. 94909/1980). However, these catalyst components are not yet satisfactory in activity and stero-regularity.

Further, methods in which a reaction produce between a porous carrier (e.g., silica) and an alkylmagnesium compound is brought into contact with an electron donor compound and a silicon halide compound prior to contacting with a titanium compound are disclosed in Japanese Patent Application Kokai Nos. 115405/1980 and 108107/1982. However, the catalyst components obtained by these methods are not yet satisfactory in performance from the industrial viewpoint.

The present inventors have previously developed catalyst components for polymerization of α-olefins (particularly propylene or the like) having high activity and stero-regularity, such as (1) a catalyst component comprising a metal oxide, an alkoxy group-containing magnesium compound, an aromatic polyhydric carboxylic acid which is substituted with a carboxyl group at the o-position thereof or a derivative thereof, and a titanium compound having contacted with each other (see Japanese Patent Application Kokai No. 174204/1986); (2) a catalyst component comprising a metal oxide, an alkoxy group-containing magnesium compound, a hydrogen-silicon bond-containing silicon compound, an electron donor compound, and a titanium compound having contacted with each other (see Japanese Patent Application Kokai No. 174205/1985); (3) a catalyst component comprising a metal oxide, an alkoxy group-containing magnesium compound, a halogen element or a halogen-containing compound, an electron donor compound, and a titanium compound having contacted with each other (see Japanese Patent Appliation Kokai No. 174206/1986); (4) a catalyst component comprising a reaction product obtained by bringing a metal oxide and a dihydrocarbylmagnesium into contact with a halogen-containing alcohol, an electron donor compound, and a titanium compound having contacted with each other (see Japanese Patent Application Kokai No. 21109/1986); and (5) a catalyst component comprising a solid which is obtained by bringing a metal oxide and a dihydrocarbylmagnesium into contact with a hydrocarbyloxy group-containing compound, a halogen-containing alcohol, an electron donor compound, and a titanium compound having contacted with each other (see Japanese Patent Application Kokai No. 7706/1987).

However, when the above-described conventional catalyst components are used, a phenomenon that fine powders of polymer are formed during the polymerization is observed. Therefore, such likely introduces a problem into the polymerization method which dislikes the formation of fine powders of polymer, such as the production of polyolefins by means of a fluidized bed. Moreover, realization of catalyst components exhibiting higher activity is being demanded.

SUMMARY OF THE INVENTION

An object of the present invention is to provide a catalyst component for olefin polymerization, which not only inhibits the formation of fine powders of polmer during the polymerization but also exhibits high polymerization activity.

The present inventors have found that a catalyst component prepared by bringing the above-described catalyst componet comprising a metal oxide, an organomagnesium compound, an electron donor compound, and a titanium compound having contacted with each other, into contact with an α-olefin in the presence of an organoalumium compound, to thereby contain a specified amount of a poly(α-olefin), can attain the object of the present invention, leading to accomplishment of the present invention.

The gist of the present invention resides in a catalyst component for olefin polymerization, prepared by bringing a titanium-containing solid which comprises (a) a metal oxide, (b) an organomagnesium compound represented by the following general formula:

$R^1MgR^2$ wherein $R^1$ and $R^2$ each represents a hydrocarbon group containing from 1 to 20 carbon atoms, a halogen atom, or an $OR^3$ group, in which $R^3$ represents a hydrocarbon group containing from 1 to 2 carbon atoms, provided that $R^1$ and $R^2$ do not represent a halogen atom at the same time, (c) an electron donor compound, and (d) a titanium compound having contacted with each other, into contact with (e) an α-olefin containing 3 carbon atoms or more in the presence of (f) an organoaluminum compound, to thereby contain a poly(α-olefin) in an amount of from 0.1 to 100 g per gram of said titanium-containing solid.

DESCRIPTION OF THE PREFERRED EMBODIMENTS OF THE INVENTION

Raw Materials for Preparation of Titanium-Containing Solid (a) Metal Oxide

The metal oxide used in the present invention is an oxide of an element selected from the group consisting of elements belonging to the Groups II to IV of the Periodic Table. Examples include $B_2O_3$, $MgO$, $Al_2O_3$, $SiO_2$, $CaO$, $TiO_2$, $ZnO$, $ZrO_2$, $SnO_2$, $BaO$, and $ThO_2$. Preferably among them are $B_2O_3$, $MgO$, $Al_2O_3$, $SiO_2$, $TiO_2$, and $ZrO_2$. Especially preferably is $SiO_2$. Further, complex oxides containing these metal oxides, such as $SiO_2$-$MgO$, $SiO_2$-$Al_2O_3$, $SiO_2$-$TiO_2$, $SiO_2$-$V_2O_5$, $SiO_2$-$Cr_2O_3$, and $SiO_2$-$TiO_2$-$MgO$, can also be used.

Usually, these metal oxides are used in the form of a powder. The particle size and shape of the powder should be properly adjusted because they affect the form of the resulting olefin polymer. In addition, the metal oxide should preferably be calcined, prior to use, at a temperature as high as possible to remove poisonous substances, and the calcined metal oxide should is isolated from the atmosphere during handling.

(b) Organomagnesium Compound

The organomagnesium compound is represented by the general formula, $R^1MgR^2$, in which $R^1$ and $R^2$ are the same as defined above. In more detail, $R^1$ and $R^2$ each represents a hydrocarbon group containing from 1 to 20 carbon atoms (such as alkyl, cycloalkyl, aryl, and aralkyl groups), a halogen atoms (such as chlorine, bromine, iodine, and fluorine atoms), or an $OR^3$ group, in which $R^3$ represents an alkyl, cycloalkyl, aryl, or aralkyl group containing from 1 to 12 carbon atoms. However, $R^1$ and $R^2$ should not represent a halogen atom at the same time.

Specific examples of the organomagnesium compound are given below, in which magnesium is abbreviated as "MG".

(1) In the case that both of $R^1$ and $R^2$ represent a hydrocarbon group (i.e., a dihydrocarbylmagnesium), examples include dimethyl Mg, diethyl Mg, ethylmentyl Mg, dipropyl Mg, diisopropyl Mg, ethylpropyl Mg, dibutyl Mg, diisobutyl Mg, di-sec-butyl Mg, ditert-butyl Mg, butylethyl Mg, butylpropyl Mg, sec-butylethyl Mg, tert-butylisopropyl Mg, sec-buty-tert-butyl Mg, dipentyl Mg, diisopentyl Mg, ethylpentyl Mg, isopropylpentyl Mg, sec-butylpentyl Mg, dihexyl Mg, ethylhexyl Mg, butylhexyl Mg, tert-butylhexyl Mg, (2-ethylbuty)ethyl Mg, (2,2-diethylbutyl)ethyl Mg, diheptyl Mg, dioctyl Mg, di-2-ethylhexyl Mg, didecyl Mg, dicylohexyl Mg, cyclohexylethyl Mg, butylcyclohexyl Mg, di(methylcyclohexyl) Mg, diphenyl Mg, ethylphenyl Mg, butylphenyl Mg, sec-butylphenyl Mg, ditolyl Mg, ethyltolyl Mg, dixylyl Mg, dibenzyl Mg, benzyl-tert-butyl Mg, diphenethyl Mg, and ethylphenethyl Mg.

These dihydrocarbylmagnesium compounds may be used in the form of a mixture or a complex compound with an organic compound of other metal. The organic compound of other metal is represented by the formla, $MR_n$, in which M represents boron, beryllium, aluminum, or zinc; R represents an alkyl, cycloalkyl, aryl, or aralkyl group containing from 1 to 20 carbon atoms; and n represents a valence of the metal M. Specific examples include treithylaluminum, tributylaluminum, triisobutylaluminum, triphenylaluminum, triethylboron, tributylboron, diethylberyllium, diisobutylberyllium, diethylzinc, and dibutylzinc.

Where the dihydrocarbylmagnesium is used in the form of a mixture or a complex compound with an organic compound of other metal, the amount of other metal is usually not higher than 5 gram-atom and preferably not higher than 2 gram-atom per gram-atom of magnesium.

(2) In the case that both of $R^1$ and $R^2$ represent $Or^3$ (i.e., a magnesium dihydrocarbyl oxide), examples include $Mg(OCH_3)_2$, $Mg(OC_2H_5)_2$, $Mg(OCH_3)(OC_2H_5)$, $Mg(Oi-C_3H_7)_2$, $Mg(OC_3H_7)_2$, $Mg(OC_4H_9)_2$, $Mg(Oi-C_4H_9)_2$, $Mg(OC_4H_9)(Oi-C_4H_9)$, $Mg(OC_4H_9),(Osec-C_4H_9)$, $Mg(OC_6H_{13})_2$, $Mg(OC_8H_{17})_2$, $Mg(OC_5H_{11})_2$, $Mg(OC_6H_5)_2$, $Mg(OC_6H_4CH_{32})_2$, $Mg(OCH_2C_6H_5)_2$, $Mg[0-2(C_2H_5)\cdot C_6H_{12}]_2$, $Mg(Oi-C_7H_{15})_2$, $Mg(Oi-C_8H_{17})_2$, and $Mg[OC(CH_3)_2C_4H_9]_2$.

These compounds are generally commercially available. Alternatively, these compounds can be obtained by the conventional methods, e.g. through reaction of metallic magnesium or the above-described dihydrocarbylmagnesium with at least one compound of an alcohol (such as ethanol, butanol, 2-ethylhexanol, and phenol), orthocarboxylic acid esters (such as ethyl orthocarbonate, ethyl orthoformate, phenyl orthoformate, and ethyl orthobenzoate), alkoxy group-containing silicon compounds (such as tetraethoxysilane and phenyltriethoxysilane), alkoxy group-containing phosporous compounds (such as triethyl phosphite and triphenyl phosphite), and alkoxy group-containing boron compounds (such as triethyl borate and tributyl borate), may be used.

(3) In the case that $R^1$ represents $OR^3$ and $R^2$ represents a halogen atom (i.e., a hydrocarbyloxymagnesium halide), examples include $Mg(OCH_3)Cl$, $Mg(OC_2H_5)Cl$, $Mg(OC_4H_9)Cl$, $Mg(OC_6H_{13})Cl$, $Mg(OC_8H_{17})Cl$, $Mg(OC_6H_5)Cl$, $Mg(OCH_3)Br$, $Mg(OC_2H_5)Br$, $Mg(Oc_4H_9)Br$, $Mg(OC_6H_{13})Br$, $Mg(OC_6H_5)Br$, $Mg(OC_2H_5)I$, and $Mg(OC_4H_9)I$.

These compounds can be obtained by, for example, partially halogenating the above-described magnesium dihydrocarbyl oxide with a halogenating agent (such as aluminum chloride, silicon tetrachloride, phosphorus pentachloride, phosphorus oxychloride, and thionyl bromide) or reacting the magnesium dihydrocarbyl oxide with a magnesium halide (such as $MgCl_2$).

Furthermore, compounds obtained by reacting (a) a Grignard compound or (b) metallic magnesium and a hydrocarbyl halide, with at least one compound of the above-described alcohols, orthocarboxylic acid esters, hydrocarbyloxy group-containing silicon compounds, hydrocarbyloxy group-containing phosphorus compounds, and hydrocarbyloxy group-containing boron compounds can also be used.

(4) In the case that $R^1$ represents a hydrocarbyl group and $R^2$ represents $OR^3$ (i.e., a hydrocarbylmagnesium hydrocarbyl oxide), examples include $Mg(CH_3)(OCH_3)$, $Mg(CH_3)(OC_2H_5)$, $Mg(C_2H_5)(OCH_3)$, $Mg(C_2H_5)(OC_2H_5)$, $Mg(C_2H_5)(OC_4H_9)$, $Mg(C_2H_5)(OC_6H_{13})$, $Mg(C_2H_5)(OC_8H_{17})$, $Mg(C_2H_5)(OC_6H_5)$, $Mg(C_4H_9)(OC_2H_5)$, $Mg(C_4H_9)(OC_4H_9)$, $7g(C_6H_{13})(OC_6H_{13})$, $Mg(C_8H_{17})(OC_8H_{17})$, and $Mg(C_6H_5)(OC_6H_5)$.

These compounds are generally commercially available. Alternatively, these compounds can be obtained by the conventional methods, e.g., through reaction of a dihydrocarbylmagnesium and an alcohol ot convert a part of the hydrocarbyl groups into an alkoxy group can be used.

(c) Electron Donor Compound

The electron donor compound includes carboxylic acids, carboxylic acid anhydrides, carboxylic acid esters, carboxylic acid halides, alcohols, ethers, ketones, amines, amides, nitriles, aldehydes, alcoholates, compounds of phosphorus, arsenic, or antimony attached to an organic group through carbon or oxygen atom, phosphamides, thioethers, thioesters, and carbonic acid esters. Preferably among them are carboxylic acids, carboxylic acid anhydrides, carboxylic acid esters, carboxylic acid halides, alcohols, and ethers.

Examples of the carboxylic acids include aliphatic monocarboxylic acids (such as formic acid, acetic acid, propionic acid, butyric acid, isobutyric acid, valeric acid, caprioc acid, pivalic acid, acrylic acid, methacrylic acid, and crotonic acid), aliphatic dicarboxylic acids (such as malonic acid, succinic acid, glutaric acid, adipic acid, sebacic acid, maleic acid, and fumaric acid), aliphatic hydroxycarboxylic acids (such as tartaric acid), alicyclic carboxylic acids (such as cyclohexanemoncarboxylic acid, cyclohexenemonocarboxylic acid, cis-1,2-cyclohexane-dicarboxylic acid, and cis-4-methylcyclohexene-1,2-dicarboxylic acid), aromatic monocarboxylic acids such as benzoic acid, toluic acid, anisic acid, p-tert-butylbenzoic acid, naphthoic acid, and cinnamic acid), and aromatic polycarboxylic acids (such as phthalic acid, isophthalic acid, terephthalic acid, naphthalic acid, trimellitic acid, hemimellitic acid, trimesic acid, pyromellitic acid, and mellitic acid).

The carboxylic acid anhydrides are anhydrides of the above-described carboxylic acids.

The carboxylic acid esters are monoesters or polyesters of the above-described carboxylic acids. Examples include butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diiosubtyl malonate, diethyl succinate, dibutyl succinate, diisobutyl succinate, diethyl glutarate, dibutyl glutarate, diisobutyl glutarate, diisobutyl dipate, dibutyl sebacate, diisobutyl sebacate, diethyl maleate, dibutyl maleate, diisobutyl maleate, monomethyl furmarate, diethyl fumarate, diisobutyl fumarate, diethyl tartrate, dibutyl tartrate, diisobutyl tartrate, ethyl cyclohexanecarboxylate, methyl benzoate, ethyl benzoate, methyl p-toluylate, ethyl-p-tert-butylbenzoate, ethyl p-anisate, ethyl α-naphthoate, isobutyl α-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, dibutyl naphthalate, triethyl trimellitate, tributyl trimellitate, tetramethyl pyrotrimellitate, tetraethyl pyrotrimellitate, and tetrabutyl pyromellitate.

The carboxylic acid halides are acid halides of the above-described carboxylic acids. Examples include acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodine, crotonic acid chloride, malonic acid chloride, malonic acid bromide, succinic acid chloride, succinic acid bromide, glutaric acid chloride, glutaric acid bromide, adipic acid chloride, adipic acid bromide, sebacic acid chloride, sebacic acid bromide, maleic acid chloride, maleic acid bromide, fumaric acid chloride, fumaric acid bromide, tartaric acid chloride, tartaric acid bromide, cyclohexanecarboxylic acid chlordie, cyclohexanecarboxylic acid bromide, 1-cyclohexenecarboxylic acid chloride, cis-4-methylcyclohexenecarboxylic acid chloride, cis-4-methylcyclohexenecarboxylic acid bromide, benzoyl chloride, benzoyl bromide, p-toluic acid chloride, p-toluic acid bromide, p-anisic acid chloride, p-anisic acid bromide, α-naphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthalic acid dichloride, Additionally, dicarboxylic acid monoalkyl halides such as adipic acid monomethyl chloride, maleic acid monoethyl chloride, maleci acid monomethyl chloride, and phthalic acid butyl chloride can be used.

The alcohols are those compounds represented by the formula, ROH, in which R represents an alkyl, alkenyl, cycloalkyl, aryl, or aralkyl group containing from 1 to 12 carbon atoms. Examples include methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethylphenol, isopropyl-phenol, p-tert-butylphenol, and n-octylphenol.

The ethers are those compounds represented by the formula, ROR', in which R and R', which may be the same or different, each represents an alkyl, alkenyl, cycloalkyl, aryl, or aralkyl group containing from 1 to 12 carbon atoms. Examples include diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisole, and ethylphenyl ether.

(d) Titanium Compound

The titanium compound is a compound of divalent, trivalent, or tetravalent titanium. Examples include titanium tetrachloride, titanium tetrabromide, trichloroethoxytitanium, trichlorobutoxytitanium, dichlorodiethoxytitanium, dichlorodibutoxytitanium, dichlorodiphenoxytitanium, chlorotriethoxytitanium, chlorotributoxytitanium, tetrabutoxytitanium, and titanium trichloride. Preferably among them are tetravalent titanium halides such as titanium tetrachloride, trichloroethoxytitanium, dichlorodibutoxytitanium, and dichlorodiphenoxytitanium. Particularly preferable is titanium tetrachloride.

Prepraration of Titanium-Containing Solid

The titanium-containing solid is obtained by bringing a metal oxide (component (a)), an organomagnesium compound (component (b)), an electron donor compound (component (c)), and a titanium compound (component (d)) into contact with each other. Though the contacting order of these components is arbitrary, it is preferred that the components (a) and (b) are first contacted with each other and then with the components (c) and (d).

The above-described contacting may be accomplished by mixing and stirring or mechanically copulverizing the components in the presence or absence of an inert medium. Examples of the inert medium include hydrocarbons (such as pentane, hexane, heptane, octane, decane, cyclohexane, benzene, toluene, and xylene) and halogenated hydrocarbons (such as 1,2-dichloroethane, 1,2-dichloropropane, carbon tetrachloride, butyl chloride, isoamyl chloride, bromobenzene, and chlorotoluene). Usually, the contacting is carried out at from −20° C. to +200° C. for from 0.1 to 100 hours.

The contacting ratios of the components (a) to (d) are usually from 0.01 to 10 in terms of a molar ratio of the component (b) to the component (a), and the amounts of the components (c) and (d) are respectviely from 0.005 to 10 g and at least 0.1 g an d preferably from 1 to 50 g, per gram-atom of magnesium metal in the contacted product between the components (a) and (b).

The titanium-containing solid which is used in the present invention is, as described above, obtained by bringing the components (a) to (d) into contact with each other. Preferbly, the contacting is carried out by any one of the following embodiments. That is, it may be carried out by using (1) a solid component comprising a metal oxide, an alkoxy group-containing magnesium compound, an aromatic polyhydric carboxylic acid which is substituted with a carboxyl group at the o-position thereof or a derivative thereof, and a titanium compound having contacted with each other (see Japanese Patent Application Kokai No. 174204/1986); (2) a solid component comprising a metal oxide, an alkoxy group-containing magnesium compound, a hydrogen-silicon bond-containing silicon compound, an electron donor compound, and a titanium compound having contacted with each other (see Japanese Patent Application Kokai No. 174205/1986); (3) a solid component comprising a metal oxide, an alkoxy group-containing magnesium compound, a halogen element or a halogen-containing compound, an electron donor compound, and a titanium compound having contacted with each other (see Japanese Patent Application Kokai No. 174206/1986); (4) a solid component comprising a reaction product obtained by bringing a metal oxide and a dihydrocarbylmagnesium into contact with a halogen-containing alcohol, an electron donor compound, and a titanium compound having contacted with each other (see Japanese Patent Application Kokai No. 21109/1986); (5) a solid component comprising a solid which is obtained by bringing a metal oxide and a dihydrocarbylmagnesium into contact with a hydrocarbyloxy group-containing compound, a halogen-containing alcohol, an electron donor compound, and a titanium compound having contacted with each other (see Japanese Patent Application Kokai No. 7706/1987). In particular, it is preferred that the contacting is carried out by using, as the titanium-containing solid, the solid component set forth in either one of the embodiments (4) or (5).

Examples of the aloxy group-containing magnesium compound in the embodiments (1) and (3) include the same magnesium dihydrocarbyl oxides, hydrocarbylmagnesium halides, and hydrocarbylmagnesium hydrocarbyl oxides as exemplified above for the component (b); examples of the alkoxy group-containing magnesium compounds in the embodiment (2) include the same magnesium dihydrocarbyl oxides and hydrocarbyloxymagnesium halides as exemplified above for the component (b); and examples of the dihydrocarbylmagnesium in the embodiments (4) and (5) include the same dihydrocarbylmagnesium as exemplified above for the component (b).

Examples of the aromatic polyhydric carboxylic acid which is substituted with a carboxyl group at the o-position thereof or derivative thereof set forth in (1) above include the same phthalic acid, trimellitic acid, hemimellitic acid and trimesic acid, and acid anhydrides, esters and acid halides thereof as exemplified above the component (c).

As the hydrogen-silicon bond-containing silicon compound set forth in (2) above, any compounds containing therein a hydrogen-silicon bond can be used. Particularly, compounds represented by the following general formula:

wherein R represents (i) a hydrocarbon group, (ii) $R^1O-$, in which $R^1$ represents a hydrocarbon group, (iii) $R^2R^3N-$, in which $R^2$ and $R^3$ each represents a hydrocarbon group, or (iv) $R^4COO-$, in which $R^4$ represents hydrogen atom or a hydrocarbon group; X represents a halogen atom; m represents a number of from 1 to 3; r is 0 or more but less than 4; and the sum of m, n, and r is 4, provided that when n exceeds 1, then R's may be the same or different, are preferred.

Examples of the hydrocarbon group represented by R, $R^1$, $R^2$, $R^3$, and $R^4$ include alkyl, alkenyl, cycloalkyl, aryl, and aralkyl groups containing from 1 to 16 carbon atoms. Examples of the alkyl group include methyl, ethyl, propyl, n-butyl, isobutyl, n-hexyl, n-octyl, 2-ethylhexyl, and n-decyl; examples of the alkenyl group include vinyl, allyl, isopropenyl, propenyl, and butenyl; examples of the cycloalkyl group include cyclopentyl and cyclohexyl; examples of the aryl group include phenyl, tolyl, and xylyl; and examples of the aralkyl group include benzyl, phenethyl, and phenylpropyl.

Preferable among them are lower alkyl groups (such as methyl, ethyl, propyl, isopropyl, n-butyl, isobutyl, and ti-butyl) and aryl groups (such as phenyl and tolyl).

X represents a halogen atom such as chlorine, bromine and iodine, preferably chlorine atom.

Examples of the silicon compound include $HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2C_2H_5SiCl$, $H_2(n-C_4H_9)SiCl$, $H_2(C_6H_4CH_3)SiCl$, $HSi(Ch_3)_3$, $HSiCH_3(OCH_3)_2$, $HSiCH_3(OC_2H_5)_2$, $HSi(OCH_3)_3$, $(C_2H_5)_2SiH_2$, $HSi(CH_3)_2(OC_2H_5)$, $HSi(CH_3)_2]N(CH_3)_2]$, $HSiCH_3(C_2H_5)_2$, $HSiC_2H_5(OC_2H_5)_2$, $HSiCH_3[N(CH_3)_2]_2$, $C_6H_5SiH_3$, $HSi(C_2H_5)_3$, $HSi(OC_2H_5)_3$, $HSi(CH_3)_2[N(C_2H_5)_2]$, $HSi[N(CH_3)_2]_3$, $C_6H_5CH_3SiH_2$, $C_6H_5(CH_3)_2SiH$, $(n-C_3H_7)_3SiH$, $HSiCl(C_6H_5)_2$, $H_2Si(C_6H_5)_2$, $HSi(C_6H_5)_2CH_3$, $(n-C_5H_{11}O)_3SiH$, $HSi(C_6H_5)_3$, and $(n-C_5H_{11})_3SiH$. Examples of compounds which do not fall within the aforesaid general formula include $(ClCH_2CH_2O)_2CH_3SiH$, $HSi(OCH_2CH_2Cl)_3$, $[H(CH_3)_2Si]_2O$, $[H(CH_3)_2Si]_2NH$, $(CH_3)_3SiOSi(CH_3)_2H$, $[H(CH_3)_2Si]_2C_6H_4$, $[H(CH_3)_2SiO]_2Si(CH_3)_2$, $[(CH_3)_3SiO]_2SiHCH_3$, $[(CH_3)_3SiO]_3SiH$, and

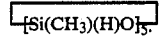

Preferable among them are silicon halides of the aforesaid general formula wherein R represents a hydrocarbon group, n is a number of from 0 to 2, and r is a number of from 1 to 3, i.e., $HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2C_2H_5SiCl$, $H_2(n-C_4H_9)SiCl$, $H_2(C_6H_4CH_3)SiCl$, and $HSiCl(C_6H_5)_2$. Particularly preferable are $HSiCl_3$, $HCH_3SiCl_2$, and $H(CH_3)_2SiCl$. Especially preferred is $HSiCl_3$.

Examples of the halogen element or halogen-containing compound set forth in (3) above are as follows.

Examples of the halogen element include chlorine, bromine, and iodine.

Examples of the halogen-containing compound include halides of a metal or non-metal element (exclusive of silicon halides containing therein a hydrogen-silicon bond), such as $BCl_3$, $BBr_3$, $BI_3$, $ICl_3$, $AlCl_3$, $AlBr_3$, $AlI_3$, $GaCl_3$, $GaBr_3$, $InCl_3$, $TlCl_2$, $SiCl_4$, $GeCl_4$, $SnCl_4$, SbCl$_5$, SbF$_5$, PCl$_3$, and PCL$_5$; hydrogen halides, such as HCl, HBr, and HI; oxy halides of a non-metal element, such as SO$_2$Cl$_2$, SOCl$_2$, NOCl, and POCL$_3$; and halogenated hydrocarbons, such as methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachlorethylene, pentachloroethane, hexachloroethane, hexabromoethane, n-propyl chloride, 1,2-dichloropropane, hexachloropropylene, octachloropropane, decabromobutane, chlorinated paraffin, chlorocyclopropane, tetrachlorocyclopentane, hexachlorocyclopentadiene, hexachlorocyclohexane, chlorobenzene, bromobenzene, o-dichlorobenzene, p-dichlorobenzene, hexachlorobenzene, hexabromobenzene, benzotrichloride, and p-chlorobenzotrichloride.

Examples of the halogen-containing alcohol set forth in (4) and (5) above are as follows. The halogen-containing alcohol is a monohydric alcohol having one hydroxyl group in one molecule or a polyhydric alcohol having two or more hydroxyl groups in one molecule, with one or more arbitrary hydrogen atoms other than that of the hydroxyl group being substituted with one or more halogen atoms. Examples of the halogen atom include chlorine, bromine, iodine, and fluorine atoms, with chlorine atom being preferred.

Examples include 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propanediol, 2-chlorocyclohexanol, 4-chlorobenzhydrol, (m,o,p)-chlorobenzyl alcohol, 4-chlorocatechol, 4-chloro-(m,o)-cresol, 6-chloro-(m,o)-cresol, 4-chloro-3,5-dimethylphenol, chlorohydroquinone, 2-benzyl-4-chlorophenol, 4-chloro-1-naphthol, (m,o,p)-chlorophenol, p-chloro-α-methylbenzyl alcohol, 2-chloro-4-phenylphenol, 6-chlorothymol, 4-chlororesorcin, 2-bromoethanol, 3-bromo-1-propanol, 1-bromo-2-propanol, 1-bromo-2-butanol, 2-bromo-p-cresol, 1-bromo-2-naphthol, 2-bromo-2-naphthol, (m,o,p)-bromophenol, 4-bromoresorcin, (m,o,p)-fluorophenol, p-iodophenol, 2,2-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromophenol, 2,4-dibromo-1-naphthol, 2,2,2-trichloroethanol, 1,1,1-trichloro-2-propanol, β/β/β/-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxytoluene, 2,3,5-tribromo-4-hydroxytoluene, 2,2,2-trifluoroethanol, α/α/α-trifluoro-m-cresol, 2,4,6-triiodophenol, 2,3,4,6-tetrachlorophenol, tetrachloro-hydroquinone, tetrachlorobisphenol A, tetrabromobisphenol A, 2,2,3,3-tetrafluoro-1-propanol, 2,3,5,6-tetrafluorophenol, and tetrafluororesorcin.

Examples of the hydrocarbyloxy group-containing compound set forth in (5) above are as follows.

The hydrocarbyloxy group-containing compound is represented by the formula, R$_q$M(OR')$_n$, in which R represents hydrogen atom or a hydrocarbon group containing from 1 to 20 carbon atoms; M represents silicon, carbon, phosphorus, boron, or aluminum atom; R' represents a hydrocarbon group containing from 1 to 20 carbon atoms; m>q≧0; m≧n>0; and m represents a valence of M.

Examples of the hydrocarbon group include alkyl groups (such as methyl, ethyl, propyl, i-propyl, butyl, amyl, hexyl, octyl, 2-ethylhexyl, and decyl), cycloalkyl groups (such as cyclopentyl, cyclohexyl, and methylcyclohexyl), alkenyl groups (such as allyl, propenyl, and butenyl), aryl groups (such as phenyl, tolyl, and xylyl), and aralkyl groups (such as phenethyl and 3-phenylpropyl). Preferable among them are alkyl groups containing from 1 to 10 carbon atoms. R and R' may be the same or different.

Examples of these compounds include compounds represented by the formula, Si(OR$^1$)$_4$ (such as Si(OCH$_3$)$_4$, Si(C$_2$H$_5$)$_4$, Si(OC$_4$H$_9$)$_4$, Si(Oi-C$_4$H$_9$)$_4$, Si(OC$_6$H$_{13}$)$_4$, Si(OC$_8$H$_{17}$)$_4$, Si[O·CH$_2$CH(C$_2$H$_5$)C$_4$H$_9$]$_4$, and Si(OC$_6$H$_5$)4), compounds represented by the formula, RSi(OR$^1$)$_3$ (such as HSi(OC$_2$H$_5$)$_3$, HSi(OC$_4$H$_9$)$_3$, HSi(OC$_6$H$_{13}$)$_3$, HSi(OC$_6$H$_5$)$_3$, CH$_3$Si(OCH$_3$)$_3$, CH$_3$Si(OC$_2$H$_5$)$_3$, CH$_3$Si(OC$_4$H$_9$)$_3$, C$_2$H$_5$Si(OC$_2$H$_5$)$_3$, C$_4$H$_9$Si(OC$_2$H$_5$)$_3$, C$_6$H$_5$Si(OC$_2$H$_5$)$_3$, and C$_2$H$_5$Si(OC$_6$H$_5$)$_3$), compounds represented by the formula, R$_2$Si(OR$^1$)$_2$ (such as (CH$_3$)$_2$Si(OCH$_3$)$_2$, (CH$_3$)$_2$Si(OC$_2$H$_5$)$_2$, (CH$_3$)$_2$Si(OC$_3$H$_7$)$_2$, (C$_2$H$_5$)$_2$Si(OC$_2$H$_5$)$_2$, and (C$_6$H$_5$)$_2$Si(OC$_2$H$_5$)$_2$), compound represented by the formula, R$_3$SiOR$^1$ (such as (CH$_3$)$_3$SiOCH$_3$, (CH$_3$)$_3$SiOC$_2$H$_5$, (CH$_3$)$_3$SiOC$_4$H$_9$, (CH$_3$)$_3$SiOC$_6$H$_5$, (C$_2$H$_5$)SiOC$_2$H$_5$, and (C$_6$H$_5$)$_3$SiOC$_2$H$_5$), compounds represented by the formula, C(OR$^1$)$_4$ (such as C(OCH$_3$)$_4$, C(OC$_2$H$_5$)$_4$, C(OC$_4$H$_9$)$_4$, C(OC$_6$H$_{13}$)$_4$, C(OC$_8$H$_{17}$)$_4$, and C(OC$_6$H$_5$)$_4$), compound represented by the formula, RC(OR$^1$)$_3$ (such as HC(OCH$_3$)$_3$, HC(OC$_2$H$_5$)$_3$, HC(OC$_3$H$_7$)$_3$, HC(OC$_4$H$_9$)$_3$, HC(OC$_6$H$_{13}$)$_3$, HC(OC$_8$H$_{17}$)$_3$, HC(OC$_6$H$_5$)$_3$, CH$_3$C(OCH$_3$)$_3$, CH$_3$C(OC$_2$H$_5$)$_3$, and C$_2$H$_5$(OC$_2$H$_5$)$_3$), compounds represented by the formula, R$_2$C(OR$^1$)$_2$ (such as CH$_3$CH(OCH$_3$)$_2$, CH$_3$CH(OC$_2$H$_5$)$_2$, CH$_2$(OCH$_3$)$_2$, CH$_2$(OC$_2$H$_5$)$_2$, and C$_6$H$_5$(OCH$_2$H$_5$)$_2$), compounds represented by the formula, P(OR$^1$)$_3$ (such as P(OCH$_3$)$_3$, P(OC$_2$H$_5$)$_3$, P(OC$_4$H$_9$)$_3$, P(OC$_6$H$_{13}$)$_3$, and P(OC$_6$H$_5$)$_3$), compounds represented by the formula, B(OR$^1$)$_3$ (such as B(OC$_2$H$_5$)$_3$, B(OC$_4$H$_9$)$_3$, B(OC$_6$H$_{13}$)$_3$, and B(OC$_6$H$_5$)$_3$), and compounds represented by the formula, Al(OR$^1$)$_3$ (such as Al(OCH$_3$)$_3$, Al(OC$_2$H$_5$)$_3$, Al(OC$_3$H$_7$)$_3$, Al(Oi-C$_3$H$_7$)$_3$, Al(OC$_4$H$_9$)$_3$, Al(Ot-C$_4$H$_9$)$_3$, Al(OC$_6$H$_{13}$)$_3$, and Al(OC$_6$H$_5$)$_3$).

In (2) above, it is preferred that the contacting of the respective components is carried out in a manner in which after contacting the component (a) and the component (b) (an alkoxy group-containing magnesium compound), the contacted product is brought into contact with the hydrogen-silicon bond-containing silicon compound (component (e)) and then with the component (c) and the component (d) simultaneously or separately. The contacting of the contacted product between the components (a) and (b) with the component (e) is carried out at from 0° to 200° C. for from 0.5 to 100 hours in the presence or absence of the above-described inert medium. The amount of the component (e) used is from 0.5 to 10 gram-mol per gram-atom of magnesium in the contacted product between the components (a) and (b).

In (3) above, it is preferred that the contacting of the respective components is carried out in a manner in which after contacting the component (a) and the component (b) (an alkoxy group-containing magnesium compound), the contacted product is brought into contact with the halogen element or halogen-containing compound (component (f)) and then with the component (c) and the component (d) simultaneously or separately. The contacting of the contacted product between the components (a) and (b) with the component (f) is carried out at from 0° to 200° C. for from 0.5 to 100 hours in the presence or absence of the above-described inert medium. The amount of the component (f) used is from 0.5 to 10 gram-mol per gram-atom of magnesium in the contacted product between the components (a) and (b).

In (4) above, as the contacting method of the component (a), dihydrocarbyloxymagnesium (component (b)), and halogen-containing alcohol (component (g)), there are (1) a method in which after contacting the components (a) and (b), the contacted product is brought into contact with the component (g); (2) a method in which after contacting the components (a) and (g), the contacted product is brought into contact with the component (b); (3) a method in which after contacting the components (b) and (g), the contacted product is brought into contact with the component (a); and (4) a method in which the components (a), (b), and (g) are brought into contact with each other simultaneously. In these cases, the contacting is usually carried out at from −20° C. to +150° C. for from 0.1 to 100 hours in the presence or absence of the above-described inert medium. The molar ratios of the component (g) to the component (a) and to the component (b) are from 0.01 to 10 and from 0.1 to 20, respectively.

In (5) above, as the contacting method of the component (a), dihydrocarbylmagnesium (component (b)), and hydrocarbyloxy group-containing compound (component (h)), the same methods as those in (4) above regarding the contacting of the components (a), (b), and (g) are employable. The contacting of the contacted product among the components (a), (b), and (h) with the halogen-containing alcohol (component (g)) is preferably carried out at from −20° C. to +150° C. for from 0.1 to 10 hours in the presence or absence of the above-described inert medium. The component (h) is used in an amount of from 0.1 to 20 mols per mol of the component (b) in the contacted product.

Though the titanium-containing solid can be produced by any one of the foregoing methods, the solid can be washed, if desired, with a hydrocarbon such as hexane, heptane, octane, cyclohexane, benzene, toluene, and xylene, followed by drying, if desired.

PREPARATION OF CATALYST COMPONENT

The catalyst component can be obtained by bringing the thus obtained titanium-containing solid into contact with an α-olefin containing 3 carbon atoms or more in the presence of an organoaluminum compound, to thereby contain a poly(α-olefin) in an amount of from 0.1 to 100 g per gram of the titanium-containing solid.

The organoaluminum compound which is used is represented by the formula, $R_nAl_{3-n}$, in which R represents an alkyl group or an aryl group; X represents a halogen atom, an alkoxy group, or hydrogen atom; and n is a number in the range of from 1 to 3. Examples include alkylaluminum compounds containing from 1 to 18 carbon atoms and preferably from 2 to 6 carbon atoms, such as trialkylaluminums, dialkylaluminum monohalides, monoalkylaluminum dihalides, alkylaluminum sesquihalides, dialkylaluminum monoalkoxides, and dialkylaluminum monohydrides, and mixtures or complex compounds thereof. Specific examples include trialkylaluminums (such as trimethylaluminum, triethylaluminum, tripropylaluminum, triisobutylaluminum, and trihexylaluminum), dialkylaluminum monohalides (such as dimethylaluminum chloride, diethylaluminum chloride, diethylaluminum bromide, diethylaluminum iodide, and diisobutylaluminum chloride), monoalkylaluminum dihalides (such as methylaluminum dichloride, ethylaluminum dichloride, methylaluminum dibromide, ethylaluminum diiodide, and isobutylaluminum dichloride), alkylaluminum sesquihalides (such as ethylaluminum sesquichloride), dialkylaluminum monoalkoxides (such as dimethylaluminum methoxide, diethylaluminum ethoxide, diethylaluminum phenoxide, dipropylaluminum ethoxide, diisobutylaluminum ethoxide, and diisobutylaluminum phenoxide), and dialkylaluminum hydrides (such as dimethylaluminum hydride, diethylaluminum hydride, dipropylaluminum hydride, and diisobutylaluminum hydride). Preferable among these compounds are trialkylaluminums, particularly triethylaluminum and triisobutylaluminum. The trialkylaluminum may be used in combination with other organoaluminum compounds such as readily commercially available diethylaluminum chloride, ethylaluminum dichloride, ethylaluminum sesquichloride, diethylaluminum ethoxide, and diethylaluminum hydride, or mixtures or complex compounds thereof.

Other organoaluminum compounds which can be used are those compounds in which two or more aluminum atoms are connected through oxygen atom or nitrogen atom. Examples of such compounds are $(C_2H_5)_2AlOAl(C_2H_5)_2$, $(C_4H_9)_2AlOAl(C_4H_9)_2$, and $(C_2H_5)_2AlN(C_2H_5)Al(C_2H_5)_2$.

The organoaluminum compound may be used alone or in combination with an electron donor compound. The electron donor compound may be any compound which is used as the component (c) at the time of preparation of the above-described titanium-containing solid. Other electron donor compounds include organosilicon compounds and those compounds containing therein a hetero atom such as nitrogen, sulfur, oxygen, and phosphorus.

Examples of the organosilicon compound include tetramethoxysilane, tetraethoxysilane, tetrabutoxysilane, tetraisobutoxysilane, tetraphenoxysilane, tetra(p-methyl-phenoxy)silane, tetrabenzyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethoxysilane, allyltrimethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropoxysilane, dimethyldibutoxysilane, dimethyldihexyloxysilane, dimethyldiphenoxysilane, diethyldiethoxysilane, diethoxydiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyloxysilane, methylphenyldimethoxysilane, and chlorophenyldiethoxysilane.

Examples of the electron donor compound containing therein a hetero atom include those compounds containing therein nitrogen atom (such as 2,2,6,6-tetramethylpiperidine, 2,6-dimethylpiperidine, 2,6-diethylpiperidine, 2,6-diisopropylpiperidine, 2,2,5,5-tetramethylpyrrolidine, 2,5-dimethylpyrrolidine, 2,5-diethylpyrrolidine, 2,5-diisopropylpyrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluylic amide, benzonitrile, acetonitrile, aniline, paratoluidine, orthotoluidine, metatoluidine, triethylamine, diethylamine, dibutylamine, tetramethylenediamine, and tributylamine), those compounds containing therein sulfur atom (such as thiophenol, thiophene, ethyl 2-thiophenecarboxylate, ethyl 3-thiophenecarboxylate, 2-methylthiophene, methyl mercaptan, ethyl mercaptan, isopropyl mercaptan, butyl mercaptan, diethyl thioether, diphenyl thioether, methyl benzenesulfonate, methyl sulfite, and ethyl sulfite), those compounds containing therein oxygen atom (such as tetrahydrofuran, 2-methyltetrahydrofuran, 3-methyltetrahydrofuran, 2-ethyltetrahydrofuran, dioxane, dimethyl ether, diethyl ether, dibutyl ether, diisoamyl ether, diphenyl ether, anisole, acetophenone, acetone, methyl ethyl ketone, acetylacetone, ethyl 2-furoate, isoamyl 2-furoate, methyl 2-furoate, and propyl 2-furoate), and those compounds containing therein phosphorus atom (such as triphenyl phosphine, tributyl phosphine, triphenyl phosphite, tribenzyl phosphite, diethyl phosphate, and diphenyl phosphate).

Two or more kinds of the electron donor compounds may be used. Further, they may be used after previously contacting with the organoaluminum compound.

The polymerization of an α-olefin for the purpose of containing an α-olefin polymer in the catalyst component of the present invention can be carried out in either one of a batchwise manner or a continuous manner or a combination thereof. The amount of the α-olefin which is prepolymerized is from 0.1 to 100 g, preferably from 0.1 to 50 g, and particularly preferably from 0.2 to 20 g, as the content of α-olefin per gram of the titanium containing solid.

Examples of the α-olefin containing 3 carbon atoms or more which is used include propylene, 1-butene, 1-hexene, and 4-methyl-1-pentene. Further, the α-olefin may be copolymerized with other olefin in an amount of up to 5 mol %. If the amount of the α-olefin which is prepolymerized exceeds the aforesaid range, polymerization activity of the catalyst and physical properties of the resulting polymer are undesirably adversely affected. On the other hand, if it is less than the aforesaid range, the desired object of the present invention cannot be achieved. The prepolymerization is preferably carried out in an inert hydrocarbon. Examples of the inert hydrocarbon include aliphatic, alicyclic, or aromatic hydrocarbons, such as propane, butane, pentane, hexane, heptane, octane, decane, kerosene, cyclohexane, benzene, toluene, and xylene.

When the prepolymerization is carried out in an inert hydrocarbon, the amount of the titanium-containing solid is preferably from 0.01 to 500 g and particularly preferably from 0.1 to 50 g per liter of the inert hydrocarbon. The organoaluminum compound is used in such an amount that the atomic ratio of aluminum to titanium is from 0.01 to 500, particularly from 0.5 to 100. When the electron donor compound and the organoaluminum compound are used in combination, the ratio of aluminum (gram-atom) to the electron donor compound (gram-mol) is from 0.1 to 100, particularly from 0.5 to 50. The prepolymerization temperature is usually not higher than 80° C. and preferably from −10° C. to +50° C. Though the prepolymerization is usually carried out under atmospheric pressure, it may be carried out at an elevated pressure, if desired. Further, the prepolymerization may be carried out in the presence of a molecular weight modifier such as hydrogen.

The catalyst component of the present invention can be produced as described above. The catalyst component thus produced may be washed, if desired, with an inert hydrocarbon such as hexane, heptane, octane, cyclohexane, benzene, toluene, and xylene, followed by drying, if desired.

Catalyst for Olefin Polymerization

The catalyst component of the present invention is combined with an organic compound of a metal belonging to the Groups I to III of the Periodic Table, to be made into a catalyst for homopolymerization of an olefin or for copolymerization of an olefin with other olefin.

Organic Compound of Metal in Groups I to III

An organic compound of lithium, magnesium, calcium, zinc, or aluminum can be used as the organometallic compound. Among these organometallic compounds, an organoaluminum compound is preferable. The organoaluminum compound is arbitrarily chosen among the above-described organoaluminum compounds used at the time of preparation of the catalyst component.

Organometallic compounds other than organoaluminum compounds are diethylmagnesium, ethylmagnesium chloride, diethylzinc, $LiAl(C_2H_5)_4$, and $LiAl(C_7H_{15})_4$.

Further, though the organometallic compound can be used singularly, it may be used in combination with an electron donor compound. As the electron donor compound, any compounds which are used at the time of preparation of the above-described catalyst component can be used. Two or more of the electron donor compounds may be used. Further, they may be used after previously contacting with the catalyst component and/or the organometallic compound.

Usually, the organometallic compound is used in an amount of from 1 to 2,000 gram-mol, particularly from 20 to 500 gram-mol, per gram-atom of titanium in the catalyst component of the present invention.

The amount of the organometallic compound is from 0.1 to 40 gram-atom and preferably from 1 to 25 gram-atom, in terms of aluminum per mol of the electron donor compound.

Polymerization of Olefin

The catalyst composed of the catalyst component of the present invention and an organometallic compound (and an electron donor compound) is useful for homopolymerization of a monoolefin containing from 2 to 10 carbon atoms and also for copolymerization of a monoolefin containing from 2 to 10 carbon atoms with other monoolefin or a diolefin containing from 3 to 10 carbon atoms. It is an outstanding catalyst for homopolymerization of α-olefins, particularly α-olefins containing from 3 to 6 carbon atoms, such as propylene, 1-butene, 4-methyl-1-pentene, and 1-hexene; and for random and block copolymerization of the above-described α-olefins with each other and/or with ethylene.

The polymerization can be carried out in either one of a gas phase or a liquid phase. The liquid phase polymerization may be accomplished in an inert hydrocarbon such as n-butane, isobutane, n-pentane, isopentane, hexane, heptane, octane, cyclohexane, benzene, toluene, and xylene; or in the liquid monomer. The polymerization temperature is usually from $-80°$ C. to $+150°$ C. and preferably from $40°$ C. to $120°$ C. The polymerization pressure is from 1 to 60 atms. The molecular weight modification of the resulting polymer is accomplished by the aid of hydrogen or any known other molecular weight modifiers present in the system. In the case of copolymerization, the quantity of other olefin to be copolymerized with the olefin is usually up to 30 wt %, particularly from 0.3 to 15 wt %, based on the principal olefin. The polymerization with the catalyst system of the present invention may be carried out continuously or batchwise under commonly employed conditions. The copolymerization may be accomplished in one step or in two more steps.

The catalyst component of the present invention is effective for the production of polyolefins, particularly isotactic polypropylene, ethylene/propylene random copolymers, and ethylene/propylene block copolymers.

The polymerization catalyst containing the catalyst component of the present invention has high polymerization activity and high stereo-regularity and keeps the high activity over a long period of time at the time of polymerization. In addition, it provides polyolefin powders having a high bulk density and good flowability.

EXAMPLES

The present invention is now described in more detail with reference to the following Examples and Application Examples. In the Examples and Application Examples, percent (%) means wt %, unless otherwise indicated.

A heptane-insoluble matter (hereinafter abbreviated as "HI") which indicates a ratio of a crystalline phase in the resulting polymer is an amount of the polymer which remains undissolved when the polymer is extracted with boiling n-heptane for 6 hours in a Soxhlet apparatus of improved type. The melt flow rate (MFR) was measured according to ASTM D1238, and the bulk density was measured according to ASTM D1895-69, Method A.

The particle size distribution of polymer was measured by using a standard sieve standardized by W. S. Tyler Co.

EXAMPLE 1

Contacting of Silicon Oxide with n-Butylethylmagnesium

In a 200-ml flask equipped with a dropping funnel and a stirrer, whose atmosphere had been replaced with nitrogen gas, were placed 5 g of silicon oxide (hereinafter abbreviated as "$SiO_2$") and 40 ml of n-heptane. (The silicon oxide is G-952, a product of Davison Co., having a specific surface area of 302 $m^2$/g, a pore volume of 1.54 $m^3$/g, and an average pore diameter of 204 Å. Prior to use, it was calcined in a nitrogen gas stream at $200°$ C. for 2 hours and then at $700°$ C. for 5 hours.) Further, there was added 20 ml of a 20% solution of n-butylethylmagnesium (hereinafter abbreviated as "BEM") in n-heptane (MAGALA BEM, a product of Texal Alkyls Co., a solution containing 26.8 mmols of BEM), followed by stirring at $90°$ C. for 1 hour.

Contacting with Tetraethoxysilane

The resulting suspension was cooled to $0°$ C. To the cooled suspension was added dropwise 20 ml of an n-heptane solution containing 11.2 g (53.6 mmols) of tetraethoxysilane from the dropping funnel over 30 minutes. After completion of the dropwise addition, the mixture was slowly heated to $50°$ C. over 2 hours, and stirring was continued at $50°$ C. for 1 hour. After completion of the reaction, a supernatant was removed by decantation. The resulting solid product was washed with 60 ml of n-heptane at room temperature, and a supernatant was removed by decantation. The washing with n-heptane was repeated four times.

Contacting with 2,2,2-Trichloroethanol

The solid product obtained above was suspended in 50 ml of n-heptane. To the resulting suspension was added a solution containing 8.0 g (53.6 mmols) of 2,2,2-trichloroethanol in 10 ml of n-heptane from the dropping funnel at $0°$ C. over 30 minutes. After completion of the dropwise addition, the mixture was slowly heated to $60°$ C. over 1 hour, and stirring was continued at $60°$ C. for 1 hour. After completion of the reaction, the resulting solid product was washed twice with 60 ml of n-heptane and then thrice with 60 ml of toluene.

Contacting with D-n-butyl Phthalate and Titanium Tetrachloride

To the solid obtained above were added 15 ml of toluene and 0.6 g of di-n-butyl phthalate, followed by reaction at $50°$ C. for 2 hours. Then, 40 ml of titanium tetrachloride was added thereto, followed by reaction at $115°$ C. for 2 hours. A supernatant was removed by decantation. The residue was washed with 60 ml of toluene at $90°$ C. for 15 minutes. The washing with toluene was again carried out. To the resulting product were added 15 ml of toluene and 40 ml of titanium tetrachloride, followed by reaction at $115°$ C. for 2 hours. After completion of the reaction, the resulting solid product was washed eight times with 60 ml of n-hexane at room temperature, followed by drying under reduced pressure at room temperature for 1 hour. There was obtained 8.5 g of a titanium-containing solid having a titanium content of 3.0%.

Prepolymerization

In a 200-ml reaction vessel equipped with a stirrer and a dropping funnel were charged 4.0 g of the titanium-containing solid obtained above and 74 ml of n-heptane to prepare a suspension. Then, 6.0 ml of an n-heptane solution of triethylaluminum (TEAL) with a TEAL content of 2.0 mols/l was further added thereto such that the TEAL concentration in the reaction mixture was 150 mmols/l. After keeping the resulting suspension at room temperature for 5 minutes, propylene was continuously added at $30°$ C., whereby polymerization of propylene was continued until about 4 g of polypropylene had been formed. Gas phase propylene was purged with nitrogen gas, and the solid phase portion was washed five times with 80 ml of n-hexane at room temperature. Further, the solid phase portion was dried under reduced pressure at room temperature for 1 hour to obtain a catalyst component. The catalyst component was found to have 1.02 g, per gram of the titanium-containing solid, of polypropylene.

EXAMPLES 2 AND 3

Catalyst components were prepared in the same manner as in Example 1 except that the TEAL concentration in the reaction mixture in the prepolymerization was changed to 30 mmols/l (Example 2) and 90 mmols/l (Example 3), respectively.

EXAMPLES 4 TO 6

Catalyst components were prepared in the same manner as in Example 1 except that the amount of propylene to be polymerized in the prepolymerization was changed as shown below.

| Example No. | Amount* of Prepolymerized Polypropylene |
|---|---|
| 4 | 0.38 |
| 5 | 3.5 |
| 6 | 17.5 |

*g-polypropylene/g-titanium-containing solid

EXAMPLES 7 TO 9

Catalyst components were prepared in the same manner as in Example 1 except that the TEAL concentration in the prepolymerization was 150 mmols/l and that diphenyl-dimethoxysilane (DPMS) was added in a concentration as shown below and kept for 5 minutes.

| Example No. | Concentration of DPMS (mmol/l) |
|---|---|
| 7 | 20 |
| 8 | 50 |
| 9 | 100 |

EXAMPLES 10 TO 12

Catalyst components were prepared in the same manner as in Example 1 except that each of the electron donor compounds as shown below was used in a concentration of 50 mmols/l in the reaction mixture.

| Example No. | Electron Donor Compound |
|---|---|
| 10 | Phenyltriethoxysilane |
| 11 | Methylphenyldimethoxysilane |
| 12 | Di-n-butyl Phthalate |

EXAMPLE 13

A catalyst component was prepared in the same manner as in Example 1 except that diethylaluminum chloride was used in place of TEAL used in the prepolymerization.

EXAMPLE 14

A titanium-containing solid with a titanium content of 2.7% was obtained in the same manner as in Example 1 except that an equimolar amount of di-n-hexylmagnesium was used in place of BEM. Further, the prepolymerization was carried out in the same manner as in Example 1 to prepare a catalyst component.

EXAMPLES 15 AND 16

Titanium-containing solids were prepared in the same manner as in Example 1 except that an equimolar amount of each of the hydrocarbyloxy group-containing compounds as shown below was used in place of tetraethoxysilane. Further, the prepolymerization was carried out in the same manner as in Example 1 to prepare catalyst components.

| Example No. | Hydrocarbyloxy Group-Containing Compound | Titanium Content (%) |
|---|---|---|
| 15 | $C_6H_5Si(OC_2H_5)_3$ | 2.8 |
| 16 | $HC(OC_2H_5)_3$ | 2.5 |

EXAMPLES 17 AND 18

Titanium-containing solids were prepared in the same manner as in Example 1 except that an equimolar amount of each of the halogen-containing alcohols as shown below was used in place of 2,2,2-trichloroethanol. Further, the prepolymerization was carried out in the same manner as in Example 1 to prepare catalyst components.

| Example No. | Halogen-Containing Alcohol | Titanium Content (%) |
|---|---|---|
| 17 | 1,1,1-Trichloro-2-propanol | 2.6 |
| 18 | p-Chlorophenol | 3.1 |

EXAMPLES 19 AND 20

Titanium-containing solids were prepared in the same manner as in Example 1 except that an equimolar amount of each of the electron donor compounds as shown below was used in place of di-n-butyl phthalate. Further, the prepolymerization was carried out in the same manner as in Example 1 to prepare catalyst components.

| Example No. | Electron Donor Compound | Titanium Content (%) |
|---|---|---|
| 19 | Ethyl Benzoate | 2.3 |
| 20 | Di-n-butyl Maleate | 2.9 |

EXAMPLE 21

Contacting between $SiO_2$ and BEM $SiO_2$ and BEM were brought into contact with each other in the same manner as in Example 1 except that the stirring was carried out at 90° C. for 2 hours. The resulting solid was washed 5 times with 50 ml of n-heptane at room temperature.

Contacting with 2,2,2-Trichloroethanol

To the solid obtained above was added 20 ml of n-heptane to prepare a suspension. To this suspension was added dropwise a solution of 9.6 g (64 mmols) of 2,2,2-trichloroethanol dissolved in 10 ml of n-heptane from the dropping funnel at 0° C. over 30 minutes, and stirring was continued at 0° C. for 1 hour. The temperature was elevated to 80° C. over 1 hour, and stirring was continued at 80° C. for 1 hour. After completion of the reaction, the reaction mixture was washed twice with 50 ml of n-heptane and then thrice with 50 ml of toluene.

Contacting with di-n-Butyl Phthalate and Titanium Tetrachloride

To the solid obtained above were added 20 ml of toluene and 0.6 g of di-n-butyl phthalate, followed by reaction at 50° C. for 2 hours. Then, 30 ml of titanium tetrachloride was added thereto, followed by reaction at 90° C. for 2 hours. A supernatant was removed by decantation. The residue was washed with 50 ml of toluene at 90° C. for 15 minutes. The washing with toluene was again carried out. To the resulting product were added 20 ml of toluene and 30 ml of titanium tetrachloride, followed by reaction at 90° C. for 2 hours. Then, the washing with n-hexane and drying were carried out in the same manner as in Example 1. There was thus obtained 7.3 g of a titanium-containing solid with a titanium content of 3.0%.

Prepolymerization

The prepolymerization was carried out in the same manner as in Example 1 except that the titanium-containing solid obtained above was used, to prepare a catalyst component.

EXAMPLE 22

A titanium-containing solid with a titanium content of 2.5% was obtained in the same manner as in Example 21 except that an equimolar amount of di-n-hexylmagnesium was used in place of BEM. Further, the prepolymerization was carried out in the same manner as in Example 1 to prepare a catalyst component.

EXAMPLES 23 AND 24

Titanium-containing solids were prepared in the same manner as in Example 21 except that an equimolar amount of each of the halogen-containing alcohols as shown below was used in place of 2,2,2-trichloroethanol. Further, the prepolymerization was carried out in the same manner as in Example 1 to prepare catalyst components.

| Example No. | Halogen-Containing Alcohol | Titanium Content (%) |
|---|---|---|
| 23 | 1,1,1-Trichloro-2-propanol | 2.4 |
| 24 | p-Chlorophenol | 3.0 |

EXAMPLES 25 AND 26

Titanium-containing solids were prepared in the same manner as in Example 21 except that an equimolar amount of each of the electron donor compounds as shown below was used in place of di-n-butyl phthalate. Further, the prepolymerization was carried out in the same manner as in Example 1 to prepare catalyst components.

| Example No. | Electron Donor Compound | Titanium Content (%) |
|---|---|---|
| 25 | Ethyl Benzoate | 2.4 |
| 26 | Diisobutyl Sebacate | 2.9 |

EXAMPLE 27

A titanium-containing solid with a titanium content of 3.5% was obtained in the same manner as in Example 21 except that an equimolar amount of ethanol was used in place of 2,2,2-trichloroethanol. Further, the prepolymerization was carried out in the same manner as in Example 1 to prepare a catalyst component.

EXAMPLE 28

In a 300-ml flask equipped with a dropping funnel and a stirrer, whose atmosphere had been replaced with nitrogen gas, were placed 5 g of $SiO_2$ as used in Example 1 and 13.4 ml of a methanol solution of $Mg(OC_2H_5)_2$ in a concentration of 2 mols/l. The mixture was stirred at the reflux temperature for 5 hours. Thereafter, the methanol was evaporated off at 60° C. under reduced pressure. Further, the contacting with di-n-butyl phthalate and titanium tetrachloride was carried out in the same manner as in Example 21 to obtain a titanium-containing solid with a titanium content of 2.8%. Then, the prepolymerization was carried out in the same manner as in Example 1 to prepare a catalyst component.

EXAMPLE 29

Preparation of Magnesium Dialkoxide

In a 300-ml flask whose atmosphere had been replaced with nitrogen gas, 25 ml (32 mmols) of the BEM solution as used in Example 1 was charged. To this solution was added dropwise a mixed solution of 10 ml (64 mmols) of 2-ethylhexanol and 20 ml of n-heptane with stirring at room temperature over 15 minutes. Then, the flask was placed on an oil bath at 120° C., and stirring was carried out at the reflux temperature of n-heptane for 1 hour, to thereby complete the reaction. There was thus obtained a colorless, transparent and tacky magnesium di-2-ethylhexyl oxide solution (solution A).

Contacting with SiO₂

In a 200-ml flask equipped with a dropping funnel and a stirrer, whose atmosphere had been replaced with nitrogen gas, were placed 5 g of $SiO_2$ as used in Example 1 and 20 ml of n-n-heptane. To the mixture was added dropwise the solution A from the dropping funnel at room temperature over 30 minutes. After completion of the dropwise addition, the temperature was elevated to 70° C., and stirring was carried out at 70° C. for 2 hours. After completion of the reaction, the reaction mixture was washed twice with 50 ml of n-heptane and then thrice with 50 ml of toluene at room temperature. There was thus obtained a solid component.

Contacting with Di-n-butyl Phthalate and Titanium Tetrachloride

The contacting with di-n-butyl phthalate and titanium tetrachloride was carried out in the same manner as in Example 21 except that the solid component obtained above was used, to obtain a titanium-containing solid with a titanium content of 2.7%.

Prepolymerization

The prepolymerization was carried out the same as in Example 1 except that the titanium-containing solid obtained above was used, to prepare a catalyst component.

EXAMPLE 30

In a 200-ml flask equipped with a dropping funnel and a stirrer, whose atmosphere had been replaced with nitrogen gas, were placed 5 g of $SiO_2$ as used in Example 1 and 20 ml of tetrahydrofuran (THF). Further, 13.4 ml of a THF solution of ethylmagnesium chloride in a concentration of 2 mols/l was added thereto, followed by stirring the mixture at the reflux temperature for 2 hours. Thereafter, the reaction mixture was washed twice with 50 ml of THF and then thrice with 50 ml of n-heptane.

The thus obtained solid was brought into contact with ethanol, di-n-butyl phthalate, and titanium tetrachloride in the same manner as in Example 27 to obtain a titanium-containing solid with a titanium content of 2.5%. Further, the prepolymerization was carried out in the same manner as in Example 1 to prepare a catalyst component.

EXAMPLE 31

To a solid obtained by bringing $SiO_2$ into contact with BEM and then with ethanol in the same manner as in Example 27 was added 40 ml of n-heptane. To the resulting mixture was added dropwise a mixed solution of 4.4 g (32 mmols) of trichlorosilane and 20 ml of n-butane from the dropping funnel with stirring at room temperature over 20 minutes, and the stirring was continued at 70° C. for an additional 6 hours. After completion of the reaction, the resulting solid was separated by filtration and washed twice with 50 ml of n-heptane and then twice with 50 ml of toluene. This solid was brought into contact di-n-butyl phthalate and titanium tetrachloride in the same manner as in Example 21 to obtain a titanium-containing solid with a titanium content of 1.4%. Further, the prepolymerization was carried out in the same manner as in Example 1 to prepare a catalyst component.

EXAMPLE 32

To a solid obtained by bringing $SiO_2$ into contact with BEM and then with ethanol in the same manner as in Example 27 was added 40 ml of n-heptane. To the resulting mixture was added dropwise a mixed solution of 12 g (0.07 mol) of $SiCl_4$ and 20 ml of n-heptane from the dropping funnel with stirring at room temperature over 45 minutes, and the stirring was continued at 70° C. for an additional 2 hours. After completion of the reaction, the resulting solid was washed twice with 50 ml of n-heptane and then thrice with 50 ml of toluene. This solid was brought into contact di-n-butyl phthalate and titanium tetrachloride in the same manner as in Example 21 to obtain a titanium-containing solid with a titanium content of 2.0%. Further, the prepolymerization was carried out in the same manner as in Example 1 to prepare a catalyst component.

EXAMPLES 33 AND 34

Catalyst components were prepared in the same manner as in Example 1 except that the propylene used in the prepolymerization was replaced by 1-butene (Example 33) and 4-methyl-1-pentene (Example 34), respectively.

EXAMPLE 35

A catalyst component was prepared in the same manner as in Example 21 except that the propylene used in the prepolymerization was replaced by 1-butene.

EXAMPLE 36

A catalyst component was prepared in the same manner as in Example 27 except that the propylene used in the prepolymerization was replaced by 1-butene.

EXAMPLE 37

A catalyst component was prepared in the same manner as in Example 31 except that the propylene used in the prepolymerization was replaced by 1-butene.

EXAMPLE 38

A catalyst component was prepared in the same manner as in Example 32 except that the propylene used in the prepolymerization was replaced by 1-butene.

APPLICATION EXAMPLE 1

Polymerization of Propylene

A mixed solution obtained by mixing 2.0 ml of (0.2 mol/l) of an n-heptane solution of TEAL and 2.0 ml (0.04 mol/l) of an n-heptane solution of DPMS and keeping for 5 minutes was charged in a stainless steel (SUS315) autoclave equipped with a stirrer, with an internal volume of 1.5 liters, in a nitrogen gas atmosphere. Then, 600 ml of hydrogen gas and 1 liter of liquefied propylene were introduced into the autoclave under pressure. After heating the reaction system at 70° C., 37.5 mg of the catalyst component obtained in Example 1 was added to the reaction system, followed by polymerization at 70° C. for 1 hour.

After completion of the polymerization, unreacted propylene was purged to obtain 234 g of a polypropylene powder. The catalyst efficiency was 6,240 for $K_H$ (an amount (g) of the formed polymer per gram of the catalyst component) and 12,600 for $K_C$ (an amount (g) of the formed polymer per gram of the titanium-containing solid), respectively. Further, the formed polymer had an HI of 95.6%, and MFR of 5.8 dg/min, and a bulk density of 0.44 g/cm³. The polymer powder had the following particle size distribution where any fine powders of less than 149 $\mu$ were not observed.

| Polymer Particle Diameter ($\mu$m) | Distribution Rate (%) |
|---|---|
| <149 | 0 |
| 149–250 | 0.1 |
| 250–350 | 0.9 |
| 350–420 | 4.1 |
| 420–590 | 21.7 |
| 590–840 | 46.2 |
| 840–1,000 | 15.5 |
| 1,000–1,680 | 11.2 |
| >1,680 | 0.3 |

APPLICATION EXAMPLES 2 TO 38

The polymerization of propylene was carried out in the same manner as in Application Example 1 except that each of the catalyst components prepared in Examples 2 to 38 was used. The results of polymerization are shown in Table 1.

APPLICATION EXAMPLE 39 (COMPARISON)

The polymerization of propylene was carried out in the same manner as in Application Example 1 except that 21.5 mg of the titanium-containing solid obtained in Example 1 was used as the catalyst component. The results obtained are shown in Table 2. The resulting polypropylene had the following particle size distribution where formation of fine powders was observed.

| Polymer Particle Diameter (μm) | Distribution Rate (%) |
| --- | --- |
| <149 | 1.8 |
| 149–250 | 1.2 |
| 250–350 | 3.2 |
| 350–420 | 5.6 |
| 420–590 | 24.3 |
| 590–840 | 41.6 |
| 840–1,000 | 12.1 |
| 1,000–1,680 | 9.8 |
| >1,680 | 0.4 |

APPLICATION EXAMPLES 40 TO 58 (COMPARISON)

The polymerization of propylene was carried out in the same manner as in Application Example 1 except that each of the titanium-containing solids obtained in Examples 14 to 32 was used as the catalyst component. The results of polymerization are shown in Table 2.

TABLE 1

| Application Example No. | Catalyst Component | Prepolymerization Amount (g/g-titanium-containing solid) | Catalyst Efficiency $K_H$ | Catalyst Efficiency $K_C$ | HI (%) | Bulk Density (g/cm³) | MFR (dg/min) | Amount of Fine Powder less than 149μ (%) |
| --- | --- | --- | --- | --- | --- | --- | --- | --- |
| 1 | Example 1 | 1.02 | 6,240 | 12,600 | 95.6 | 0.44 | 5.8 | 0 |
| 2 | Example 2 | 1.00 | 5,550 | 11,100 | 95.3 | 0.44 | 6.1 | 0 |
| 3 | Example 3 | 0.95 | 6,530 | 12,700 | 96.6 | 0.45 | 7.3 | 0 |
| 4 | Example 4 | 0.38 | 9,010 | 12,400 | 95.5 | 0.44 | 5.9 | 0.1 |
| 5 | Example 5 | 3.5 | 2,640 | 11,900 | 95.6 | 0.44 | 7.7 | 0 |
| 6 | Example 6 | 17.5 | 660 | 12,300 | 95.4 | 0.44 | 6.4 | 0 |
| 7 | Example 7 | 1.10 | 5,500 | 11,500 | 96.0 | 0.44 | 5.8 | 0 |
| 8 | Example 8 | 1.07 | 5,260 | 10,900 | 97.1 | 0.45 | 6.6 | 0 |
| 9 | Example 9 | 1.04 | 4,290 | 8,760 | 97.2 | 0.44 | 8.2 | 0 |
| 10 | Example 10 | 0.98 | 4,670 | 9,250 | 97.9 | 0.46 | 17.3 | 0 |
| 11 | Example 11 | 1.12 | 4,750 | 10,100 | 97.1 | 0.45 | 4.5 | 0 |
| 12 | Example 12 | 1.04 | 4,170 | 8,510 | 95.2 | 0.43 | 3.6 | 0 |
| 13 | Example 13 | 0.30 | 9,180 | 11,900 | 95.2 | 0.43 | 6.3 | 0 |
| 14 | Example 14 | 1.03 | 5,880 | 11,900 | 95.5 | 0.44 | 7.2 | 0 |
| 15 | Example 15 | 0.98 | 5,870 | 11,600 | 95.4 | 0.45 | 8.1 | 0 |
| 16 | Example 16 | 1.12 | 4,980 | 10,600 | 95.0 | 0.43 | 6.5 | 0 |
| 17 | Example 17 | 1.05 | 5,520 | 11,300 | 95.4 | 0.44 | 6.9 | 0 |
| 18 | Example 18 | 1.00 | 5,590 | 11,200 | 95.3 | 0.44 | 9.3 | 0 |
| 19 | Example 19 | 1.05 | 5,000 | 10,200 | 94.8 | 0.43 | 6.9 | 0 |
| 20 | Example 20 | 0.98 | 5,520 | 10,900 | 95.3 | 0.44 | 5.8 | 0 |
| 21 | Example 21 | 0.99 | 3,380 | 6,720 | 95.9 | 0.45 | 7.2 | 0.2 |
| 22 | Example 22 | 1.08 | 2,750 | 5,730 | 95.5 | 0.44 | 9.5 | 0.1 |
| 23 | Example 23 | 1.13 | 2,570 | 5,470 | 95.6 | 0.43 | 8.8 | 0.3 |
| 24 | Example 24 | 0.91 | 2,970 | 5,680 | 95.6 | 0.44 | 7.9 | 0.3 |
| 25 | Example 25 | 0.96 | 24,10 | 4,720 | 94.9 | 0.43 | 7.7 | 0.4 |
| 26 | Example 26 | 1.12 | 23,40 | 4,950 | 95.2 | 0.43 | 8.6 | 0.3 |
| 27 | Example 27 | 0.96 | 2,820 | 5,520 | 95.0 | 0.43 | 6.4 | 0.2 |
| 28 | Example 28 | 1.01 | 1,940 | 3,890 | 95.1 | 0.43 | 6.8 | 0.5 |
| 29 | Example 29 | 1.12 | 2,340 | 4,960 | 95.0 | 0.44 | 8.3 | 0.1 |
| 30 | Example 30 | 0.88 | 1,840 | 3,450 | 94.8 | 0.42 | 7.5 | 0.6 |
| 31 | Example 31 | 1.00 | 3,190 | 6,370 | 95.6 | 0.45 | 6.9 | 0.1 |
| 32 | Example 32 | 1.07 | 3,000 | 6,210 | 95.5 | 0.44 | 7.4 | 0.2 |
| 33 | Example 33 | 0.31 | 7,790 | 10,200 | 95.3 | 0.43 | 6.9 | 0.1 |
| 34 | Example 34 | 0.14 | 8,460 | 9,650 | 95.2 | 0.42 | 7.5 | 0.2 |
| 35 | Example 35 | 0.23 | 4,370 | 5,380 | 95.5 | 0.43 | 5.9 | 0.3 |
| 36 | Example 36 | 0.20 | 3,730 | 4,480 | 94.7 | 0.43 | 8.2 | 0.4 |
| 37 | Example 37 | 0.21 | 4,150 | 5,020 | 95.4 | 0.43 | 6.4 | 0.5 |
| 38 | Example 38 | 0.25 | 3,910 | 4,890 | 95.3 | 0.43 | 7.6 | 0.4 |

TABLE 2 (Comparison)

| Application Example | Titanium-Containing Solid | $K_C$ | HI (%) | Bulk Density (g/cm³) | MFR (dg/min) | Amount of Fine Powder less than 149μ (%) |
| --- | --- | --- | --- | --- | --- | --- |
| 39 | Example 1 | 8,120 | 94.6 | 0.38 | 9.8 | 1.8 |
| 40 | Example 14 | 7,720 | 94.5 | 0.38 | 8.5 | 1.8 |
| 41 | Example 15 | 7,690 | 94.4 | 0.38 | 6.3 | 1.9 |
| 42 | Example 16 | 6,930 | 94.0 | 0.37 | 7.5 | 1.7 |
| 43 | Example 17 | 7,420 | 94.3 | 0.38 | 7.8 | 1.6 |
| 44 | Example 18 | 7,150 | 94.3 | 0.38 | 6.9 | 1.7 |
| 45 | Example 19 | 6,620 | 93.4 | 0.37 | 9.8 | 2.1 |
| 46 | Example 20 | 7,170 | 94.8 | 0.38 | 7.5 | 1.6 |
| 47 | Example 21 | 4,350 | 94.8 | 0.39 | 9.3 | 2.3 |
| 48 | Example 22 | 3,950 | 94.5 | 0.38 | 9.8 | 2.2 |
| 49 | Example 23 | 3,860 | 94.5 | 0.38 | 8.5 | 2.5 |
| 50 | Example 24 | 3,640 | 94.4 | 0.38 | 7.3 | 2.6 |
| 51 | Example 25 | 3,090 | 93.3 | 0.37 | 8.4 | 3.4 |
| 52 | Example 26 | 3,260 | 94.0 | 0.38 | 8.6 | 2.9 |

TABLE 2-continued (Comparison)

| Application Example | Titanium-Containing Solid | $K_C$ | HI (%) | Bulk Density (g/cm$^3$) | MFR (dg/min) | Amount of Fine Powder less than 149μ (%) |
|---|---|---|---|---|---|---|
| 53 | Example 27 | 3,720 | 94.0 | 0.38 | 9.1 | 2.5 |
| 54 | Example 28 | 2,540 | 93.5 | 0.36 | 8.8 | 3.5 |
| 55 | Example 29 | 3,310 | 93.6 | 0.37 | 6.7 | 2.3 |
| 56 | Example 30 | 2,270 | 92.5 | 0.36 | 7.1 | 3.2 |
| 57 | Example 31 | 4,160 | 94.5 | 0.38 | 8.9 | 2.1 |
| 58 | Example 32 | 4,050 | 94.6 | 0.38 | 6.5 | 2.0 |

What is claimed is:

1. A catalyst component for olefin polymerization, prepared by bringing a titanium-containing solid which comprises (a) a metal oxide, (b) an organomagnesium compound represented by the following general formula:

$$R^1MgR^2$$

wherein $R^1$ and $R^2$ each represents a hydrocarbon group containing from 1 to 20 carbon atoms, a halogen atom, or an $OR^3$ group in which $R^3$ represents a hydrocarbon group containing from 1 to 12 carbon atoms, provided that $R^1$ and $R^2$ do not represent a halogen atom at the same time, (c) an electron donor compound, and (d) a titanium compound having contacted with each other, into contact with (e) an α-olefin containing 3 carbon atoms or more in the presence of (f) an organoaluminum compound, to thereby contain a poly(α-olefin) in an amount of from 0.1 to 100 g per gram of said titanium-containing solid.

2. A catalyst system for the polymerization of olefins comprising:

a. A catalyst component for olefin polymerization, prepared by bringing a titanium-containing solid which comprises (a) a metal oxide, (b) an organomagnesium compound represented by the following general formula:

$$R^1MgR^2$$

wherein $R^1$ and $R^2$ each represents a hydrocarbon group containing from 1 to 20 carbon atoms, a halogen atom, or an $OR^3$ group in which $R^3$ represents a hydrocarbon group containing from 1 to 12 carbon atoms, provided that $R^1$ and $R^2$ do not represent a halogen atom at the same time, (c) an electron donor compound, and (d) a titanium compound having contacted with each other, into contact with (e) an α-olefin containing 3 carbon atoms or more in the presence of (f) an organoaluminum compound, to thereby contain a poly(α-olefin) in an amount of from 0.1 to 100 g per gram of said titanium-containing solid, and b. An organometallic cocatalyst.

* * * * *